United States Patent [19]

Bartholomew

[11] Patent Number: 4,677,861

[45] Date of Patent: Jul. 7, 1987

[54] FORCE RECORDING SEAT BELT ASSEMBLY

[75] Inventor: Donald D. Bartholomew, Marine City, Mich.

[73] Assignee: Proprietary Technology, Inc., Southfield, Mich.

[21] Appl. No.: 776,643

[22] Filed: Sep. 16, 1985

[51] Int. Cl.$^4$ .................. G01D 1/12; G01D 21/02; G04E 7/00

[52] U.S. Cl. .................. 73/862.54; 73/862.39; 73/862.53; 116/203; 368/1; 368/89

[58] Field of Search .......... 73/862.39, 862.51, 862.53, 73/862.54, 862.62, 492; 116/203, 206, 212; 280/801, 805, 806; 340/52 E; 368/1, 6, 89, 110

[56] References Cited

U.S. PATENT DOCUMENTS

| | | | |
|---|---|---|---|
| 834,843 | 10/1906 | O'Connor | 73/862.51 |
| 2,385,116 | 9/1945 | Trimbach | 73/862.53 X |
| 2,723,560 | 11/1955 | Exline | 73/862.51 |
| 3,018,611 | 1/1962 | Biritz | 116/206 X |
| 3,428,362 | 2/1969 | Bertelson et al. | |
| 3,438,674 | 4/1969 | Radke et al. | |
| 3,692,361 | 9/1972 | Ivarsson | |
| 3,717,991 | 2/1973 | Klar | 368/1 |
| 3,874,694 | 4/1975 | Stephenson | 340/52 E X |
| 3,885,428 | 5/1975 | Dalferth | |
| 3,908,452 | 9/1975 | Rieger | |
| 4,103,640 | 8/1978 | Feder | 73/492 X |
| 4,111,459 | 9/1978 | Magyar | |
| 4,129,321 | 12/1978 | Garvey | |
| 4,424,509 | 1/1984 | Andres et al. | 116/203 X |
| 4,457,251 | 7/1984 | Weman et al. | |

FOREIGN PATENT DOCUMENTS

| | | | |
|---|---|---|---|
| 2436325 | 4/1975 | Fed. Rep. of Germany | 280/805 |
| 2508728 | 9/1976 | Fed. Rep. of Germany | |
| 1433618 | 4/1976 | United Kingdom | |

Primary Examiner—Charles A. Ruehl
Attorney, Agent, or Firm—Harness, Dickey & Pierce

[57] ABSTRACT

The present safety belt assembly measures the amount of force exerted on the assembly and, also, the point in time when a force was exerted on the assembly. The assembly comprises a first and second member; a mechanism coupled with the first and second members which provides incremental movement of the members; a resilient biasing member in communication with the members for maintaining the members in a first relaxed position; the resilient biasing member enabling the measurement of an amount of force exerted on the assembly; a mechanism for indicating when a force is exerted on the assembly and a mechanism for securing the assembly to a belt and buckle.

24 Claims, 6 Drawing Figures

FORCE RECORDING SEAT BELT ASSEMBLY

TECHNICAL FIELD

The present invention generally relates to the field of seat belt assemblies and, more specifically, to seat belt assemblies having devices for measuring the force exerted on the belt during collisions and for indicating when the collision took place.

BACKGROUND AND SUMMARY OF THE INVENTION

Several industries, including motor vehicle, transportation and insurance, desire to have a device in the safety belt system of a motor vehicle which will indicate whether or not the safety belt was worn during an impact collision. Also, if the device was worn, when the collision occurred. In the past, the loading could only be determined when the belt was abraded, chafed or if the metal supports were bent or broken. However, many vehicle collisions are not severe enough as to bend or break the metal supports since they are made of very durable material. Thus, by a visual examination of a built-in safety belt assembly, it is not always possible to determine if the safety belt assembly was subject to a collision or if excessive forces had been exerted on the assembly.

In order to overcome the inability to determine whether or not a safety belt was worn during a collision, it is one of the primary objects of the present invention to provide a safety belt assembly which determines the amount of force exerted on the safety belt assembly.

An additional objective of the present invention is to provide the point in time when the excessive force was exerted on the safety belt assembly.

To achieve the foregoing objectives, a safety belt assembly according to the present invention provides a first and second plate, means for providing incremental movement of the plates with respect to one another, a resilient biasing means in communication with the plates for maintaining the plates in a first relaxed position, means for indicating when a force is exerted on the assembly, and means for securing the plates to a conventional belt and buckle.

More particularly, the means for providing incremental movement is comprised of intermeshing fingers positioned on both plates which ratchet incrementally moving and locking the second plate in the first plate in response to a force exerted on the assembly.

Additional objects and advantages of the present invention will become apparent from the reading of the detailed description of the preferred embodiments, which make reference to the accompanying drawings.

DETAILED DESCRIPTION OF THE INVENTION

Figure 1:
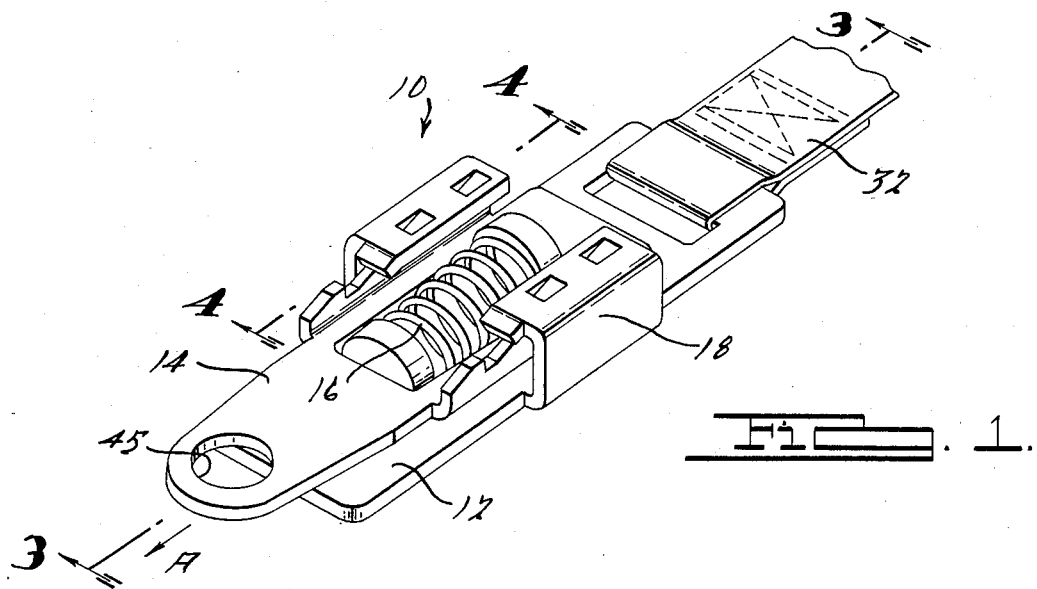
FIG. 1 is a perspective view of the safety belt assembly made in accordance with a first embodiment of the present invention.
Figure 2:
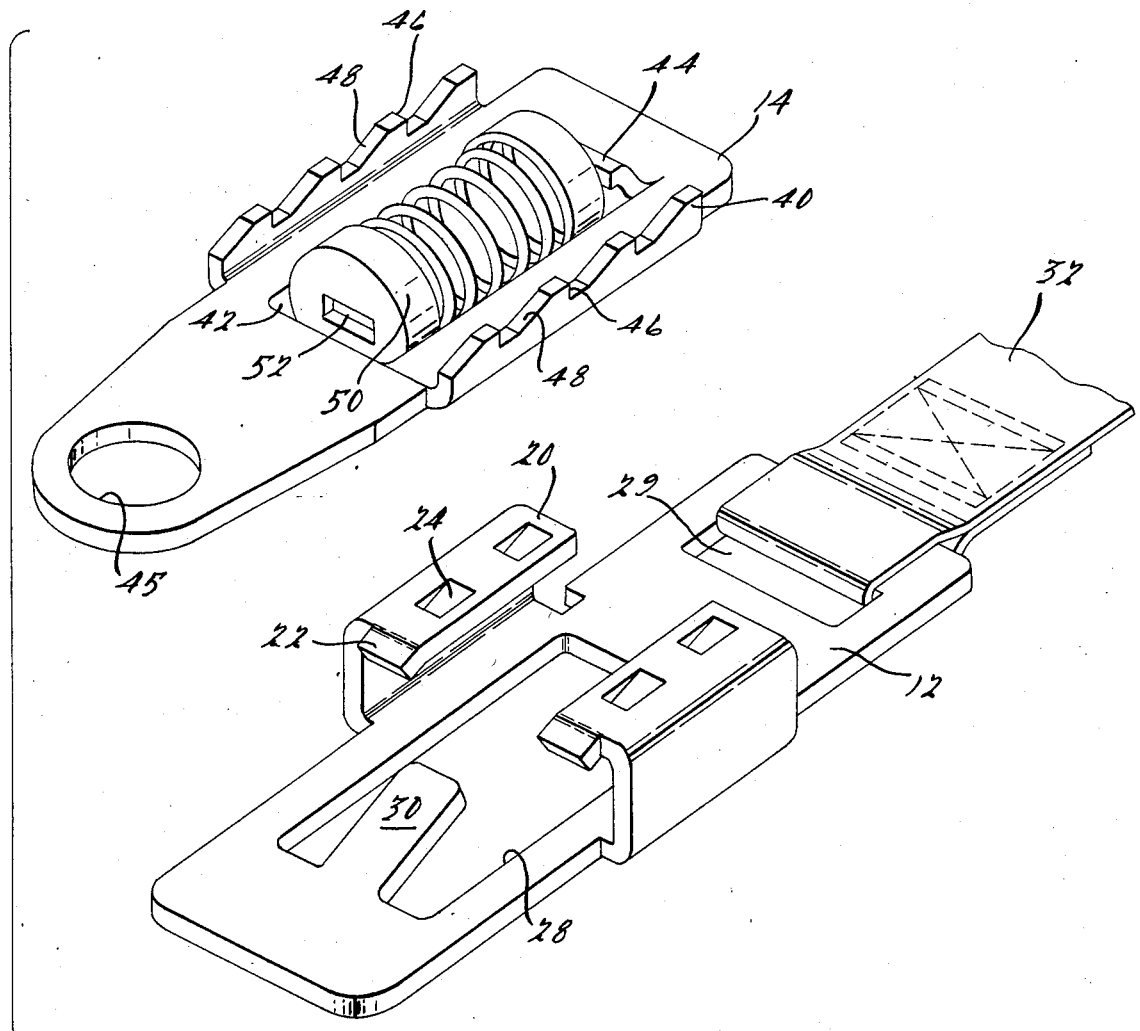
FIG. 2 is an exploded view of FIG. 1.
Figure 3:
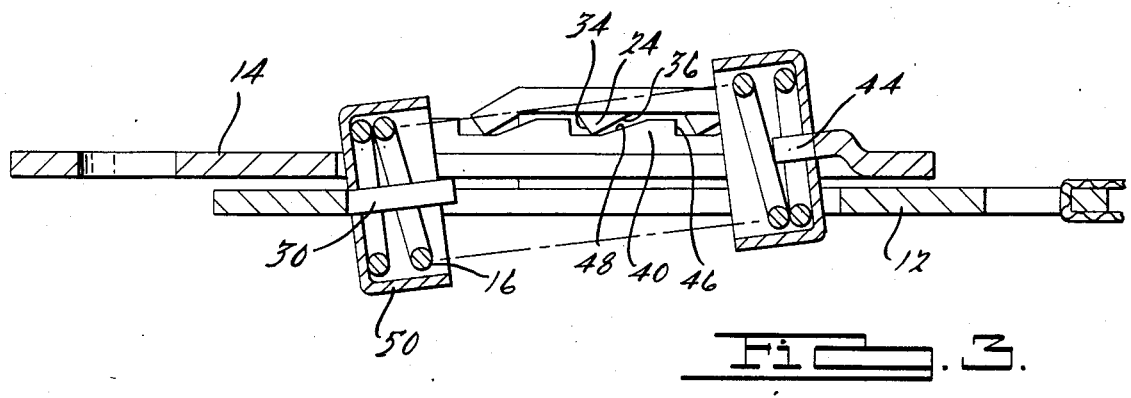
FIG. 3 is a cross-sectional view along lines 3—3 of FIG. 1.
Figure 4:
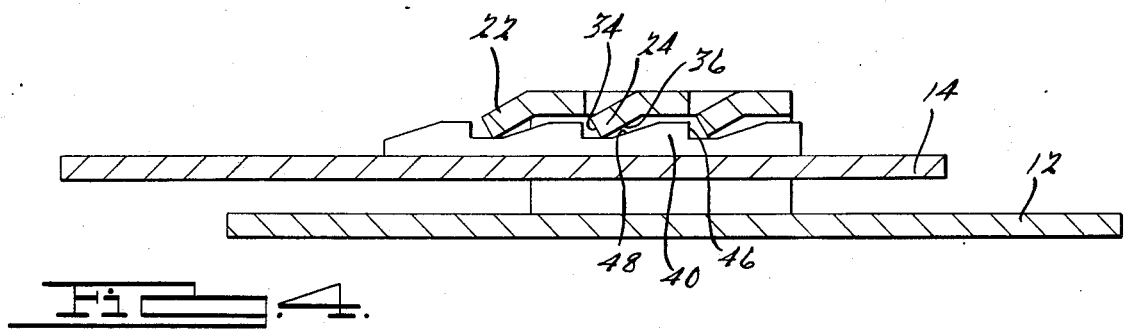
FIG. 4 is a cross-sectional view along lines 4—4 of FIG. 1.

A seat belt assembly for recording force exerted on the assembly is generally illustrated in FIGS. 1 and 2 and is designated with the reference numeral 10. The seat belt assembly 10 includes a first plate 12, a second plate 14 and a resilient biasing member 16. A pair of retainers 18 are on the first plate 12 for maintaining the second plate 14 in a movable relationship with the first plate 12.

The first plate 12 has an overall rectangular configuration as seen in FIG. 2. The retainers 18 extend vertically from the plate 12 forming a pair of guide walls for positioning the second plate 14 in a substantially parallel plane relationship with the first plate 12. The first plate 12 has an aperture 28, which has a tongue 30 projecting into the aperture 28, for positioning the biasing member 16 between the plates 12 and 14. The aperture 28 is preferably rectangular and is positioned between the retainers 18 on the first plate 12. A second aperture 29 is in the first plate 12 for securing the first plate 12 to a conventional automobile safety belt 32. The aperture 29 enables the safety belt 32 to be placed through the first plate 12 and attached to itself for permanently securing the first plate 12 onto the belt 32.

The retainers 18 have a flange 20, extending horizontally from the retainers 18, which is substantially parallel to the first plate 12. The flanges 20 have at least one or more fingers 24 projecting from the interior surface of the flange 20. The flanges 20 have a descending tit 22 which substantially functions the same as the fingers 24 which will be further discussed herein.

The fingers 24, on the interior surface of the flange 20, descend at a desired angle. The fingers 24 are generally formed by a U-shaped cut in the flanges 20. The material within the U-cut is bent downward towards the first plate 12 forming the fingers 24. The fingers 24 have a back stop 34 which enable one way movement of the second plate 14. The fingers 24 have an annular wall 36 which enable the second plate 14 to slide one way against the fingers 24 before the backstop 34 traps the second plate 14 prohibiting movement of the second plate in a reverse direction. The fingers 24 enable the second plate 14 to move incrementally in the first plate 12.

The tongue 30 projects angularly above the aperture 28. The tongue 30 acts as a stop to secure the biasing member 16 on the first plate 12 in the assembly 10. Also, if a force of extreme magnitude is applied to the assembly 10 the tongue 30 will come into contact with the second plate 14 prohibiting further movement of the second plate 14.

The second plate 14 has an overall rectangular configuration as best seen in FIG. 2. At least one or more fingers 40 project vertically from the second plate 14. The second plate 14 has an aperture 42 which has a tongue 44 projecting into the aperture 42. The aperture 42 is preferably rectangular and enables the resilient biasing member 16 to communicate with the first and second plates 12 and 14. A second aperture 45 is in the second plate 14 for securing the assembly 10 to a conventional buckle (not shown).

The fingers 40 include an inclined wall 48 and a backstop 46. The fingers 40 intermesh with the fingers 24 enabling the second plate 14 to move, in the direction of arrow A, incrementally in the first plate 12. The incremental movement occurs as follows. The inclined wall 48 slides against the wall 36 until backstop 46 passes the wall 36, wherein the backstop 46 comes into contact with the backstop 34. This abutting of the backstops 34 and 46 prohibits movement of the second plate 14 in a reverse direction. The intermeshing of fingers 24 with fingers 40 provides the assembly 10 with a ratchet interface between the two plates 12 and 14. Thus, as the second plate 14 moves, the fingers 40 will ratchet along fingers 24 incrementally moving the second plate 14 in the first plate 12.

The resilient biasing member 16, positioned between apertures 28 and 42, is in communication with the first and second plates 12 and 14, holding the plates 12 and 14 in a first relaxed position, as best seen in FIG. 1. The resilient biasing member 16 is preferably a helical spring. The biasing member 16 has a pair of caps 50, one on each end of the spring, for equal distribution of the spring force. The caps 50 have apertures 52 which enable the biasing member to be positioned on the tongues 30 and 44. The biasing member 16 supplies a resistive force to the plates 12 and 14 which keeps the fingers 24 and 40 in contact with one another.

Figure 5:
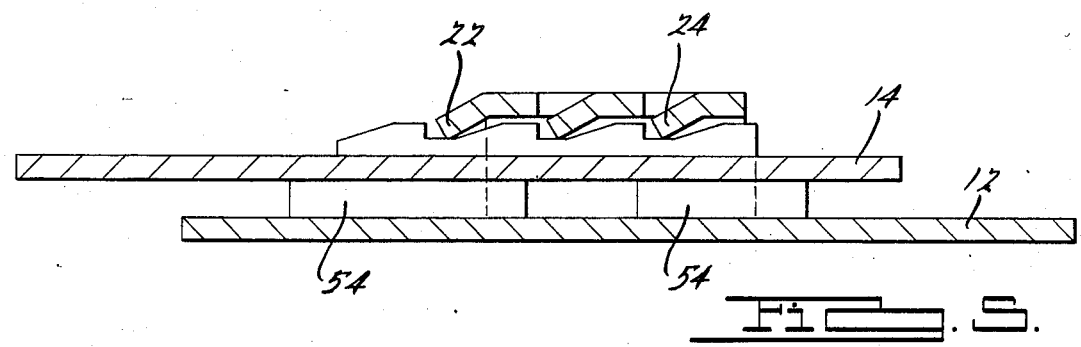
FIG. 5 is a cross-sectional view illustrating a time indicator made in accordance with the present invention.

The time indicator 54, best seen in FIG. 5, may be an electrical means, mechanical means, or a chemical means which will determine when a force was exerted on the safety belt assembly 10. An electrical means could include a starting mechanism and a conventional digital watch assembly having an elapsed time counter. Preferably, a chemical device is used which decays at a determined measurable rate. This decay provides the analyst with a simple determination as to when the force occurred from knowing the initial concentration, the decay rate and the remaining concentration of the chemical.

The time indicator 54 is positioned in communication with the plates 12 and 14. Preferably, the time indicator 54 would be positioned between plates 12 and 14 on one side of apertures 28 and 42. The time indicator 54 may be an encapsulated foam having an exterior coating and a predetermined amount of chemical within the foam. Once a force is exerted on the indicator 54, strong enough to break through the encapsulated coating, the chemical will begin to decay in the presence of atmospheric conditions. Thus, when analyzed, the time indicator 54 will determine when the excessive force was exerted on the safety belt assembly 10.

Figure 6:
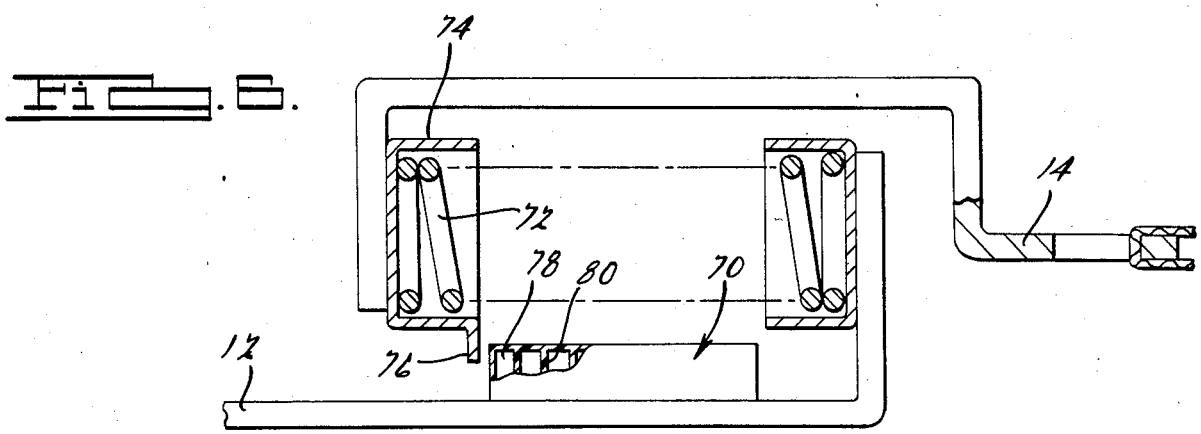
FIG. 6 is a cross-sectional view of a second embodiment of a time indicator made in accordance with the present invention.

In a second embodiment of the present invention, best seen in FIG. 6, the time indicator 70 is in communication with a biasing member 72. The biasing member 72, preferably a helical spring, has a housing 74 around its circumference. The housing 74 has a flange 76. In this embodiment the biasing member 72 returns to a relaxed position after every compression. The flange 76 is positioned in a line of contact with the time indicator 70 as the biasing member 72 is compressed. The time indicator 70 includes several encapsulated pockets 78. A wall 80 separates the pockets 78 from one another. As the biasing member 72 is compressed the flange 76 slides over the encapsulated time indicator 70. As this happens, the flange 76 breaks through the encapsulated coating, enabling individual pockets 78 of the time indicator 70 to decay. This breakthrough occurs through one pocket 78 at a time. Thus, as small forces are exerted on the assembly 10, the flange 76 may break through only one pocket 78. When an excessive force is exerted on the assembly 10, the flange 76 will break through several pockets 78. A decay analysis of the remaining chemicals in each pocket 78 will determine the time when each pocket 78 was broken. The more pockets 78 broken through at one time will indicate a large amount of force exerted on the assembly 10 at that time. Thus, the analyst will be able to determine when the force occurred. Also, the analyst will be able to determine the force exerted on the assembly by measuring the distance traveled by the biasing member 72 along the time indicator 70.

In the present invention the assembly 10 is assembled as shown in FIG. 1. The second plate 14 is secured, by aperture 45, in a conventional safety belt buckle (not shown). A force is exerted on the assembly 10 which has a magnitude large enough to activate the assembly 10. The second plate 14 slides, in direction of arrow A, in the first plate 12. This slide measures the force exerted on the assembly and the point in time when the force was exerted.

The slide occurs as follows. The second plate fingers 40 are intermeshed with the first plate fingers 24. As the force is exerted, the second plate fingers 40 ratchet on the first plate fingers 24 moving, in the direction of arrow A, in accordance with the force exerted. The second plate back stop 46 comes into contact with a first plate back stop 34 halting the movement of the second plate 14 in a reverse direction. As this happens, the biasing member 16 compresses between the tongues 30 and 44 trapping the biasing member 16 in a compressed state. This compressed state records the force exerted on the assembly 10. Also, as the second plate 14 ratchets in the first plate 12, the time indicator 54 is activated. The second plate 14 compresses the encapsulated time indicator 54, breaking through the coating, exposing the chemical to atmospheric conditions, beginning chemical decay: the amount of decay is used to determine when the exertion of force occurred.

The force exerted will be measured by conventional spring equations since the spring constant and the linear displacement of the spring will be known. The time when the force was exerted will be determined by an analysis of the amount of the chemical remaining with respect to its known dissipation rate and the original chemical concentration.

Once the analyst has determined the amount of force exerted on the assembly 10 and at what point in time the force was exerted on the assembly 10 he may reset the assembly 10 for further use. This is done by replacing the time indicator 54 and resetting the biasing means 16 and fingers 24 and 40 back to their relaxed positions. Thus, the assembly 10 is ready to be reinstalled in a vehicle.

While the above disclosure fulfills the embodiments of the present invention, it will become apparent to those skilled in the art that modifications, variations and alterations may be made without deviating from the scope and spirit of the present invention.

What is claimed is:

1. A safety belt assembly for measuring the force exerted on the assembly, the assembly comprising:
   a first and second member;
   means associated with said first and second members for providing incremental movement of said members with respect to one another the amount of incremental movement enabling a measurement of said force;

a resilient biasing means in communication with said members for maintaining said members in a first relaxed position when no force is exerted, said biasing means resiliently restraining said incremental movement of said members when said force is exerted;

means on at least one of said members for securing said assembly into a buckle; and means on at least one of said members for securing said assembly onto a belt.

2. The safety belt assembly according to claim 1 wherein the means for providing incremental movement of said members comprises one or more fingers projecting from said first member intermeshed with one or more fingers projecting from said second member.

3. The safety belt assembly according to claim 2 wherein said one or more intermeshing fingers ratchet along one another for providing said incremental movement of said members.

4. The safety belt assembly according to claim 3 wherein said one or more intermeshing fingers provide said assembly with unidirectional movement of one of said members with respect to the other said member.

5. The safety belt assembly according to claim 4 wherein means for trapping said one or more intermeshing fingers in one another prohibits reverse movement of said one of said members with respect to the other said member in said assembly.

6. The safety belt assembly according to claim 3 wherein one or more retainers maintains said first and second members in a substantially parallel relationship with one another.

7. The safety belt assembly according to claim 6 wherein said one or more retainers are on said first member and said one or more fingers projecting from said first member are on said one or more retainers.

8. The safety belt assembly according to claim 1 wherein said biasing means is a helical spring which is linearly compressed when said members move incrementally.

9. The safety belt assembly according to claim 1 wherein said first and second members being plates.

10. A safety belt assembly for indicating the point in time when a force was exerted onto the safety belt assembly, said assembly comprising:

a first and second member associated with one another;

means associated with said first and second members for resiliently restraining relative movement and movably retaining said members with respect to one another;

means responsive to relative movement of said first and second members for indicating a point in time when a force was exerted on said assembly;

means on at least one of said members for securing said assembly into a buckle; and means on at least one of said members for securing said assembly onto a belt.

11. The safety belt assembly according to claim 10 wherein the means for movably retaining said members is comprised of means for providing incremental movement of said members with respect to one another and a resilient biasing means in communication with said members for maintaining said members in a first relaxed position when no force is exerted.

12. The safety belt assembly according to claim 11 wherein said means for indicating when force was exerted comprises a chemical means which decays at a known predetermined rate when exposed to atmospheric conditions.

13. The safety belt assembly according to claim 12 wherein an encapsulated means seals said chemical means prohibiting said chemical means from being in contact with atmospheric conditions.

14. The safety belt assembly according to claim 13 wherein a coating is formed on the exterior of said encapsulated means which when subject to a force, is broken, enabling said chemical means to escape to the atmosphere beginning the decaying process.

15. The safety belt assembly according to claim 11 wherein said means for indicating when force was exerted is comprised of an electronic means which includes a starting means and a means for indicating elapsed time.

16. The safety belt assembly according to claim 10 wherein said first and second members being plates.

17. A safety belt assembly for measuring the force exerted and indicating the point in time when the force was exerted on the assembly, said assembly comprising:

a first and second member;

means associated with said first and second members for providing incremental movement of said members with respect to one another the amount of incremental movement enabling a measurement of said force;

a resilient biasing means in communication with said members for maintaining said members in a first relaxed position when no force is exerted, said biasing means resiliently restraining said incremental movement of said members when said force is exerted;

means responsive to said movement of said members for indicating a point in time when a force was exerted on said assembly;

means on at least one of said members for securing said assembly into a buckle; and means on at least one of said members for securing said assembly onto a belt.

18. The safety belt assembly according to claim 17 wherein the means for providing incremental movement of said members comprises one or more fingers projecting from said first member intermeshed with one or more fingers projecting from said second member.

19. The safety belt assembly according to claim 18 wherein said one or more intermeshing fingers ratchet along one another for providing said incremental movement of said members.

20. The safety belt assembly according to claim 19 wherein said one or more intermeshing fingers provide said assembly with unidirectional movement of one of said members with respect to the other said member and means for trapping said one or more intermeshing fingers in one another prohibiting reverse movement of said one of said members with respect to the other said member in said assembly.

21. The safety belt assembly according to claim 20 wherein said means for indicating when force was exerted comprises a chemical means which decays at a known predetermined rate when exposed to atmospheric conditions.

22. The safety belt assembly according to claim 21 wherein an encapsulated means seals said chemical means prohibiting said chemical means from being in contact with atmospheric conditions.

23. The safety belt assembly according to claim 22 wherein a coating is formed on the exterior of said encapsulated means which when subject to a force is broken, enabling said chemical means to escape to the atmosphere beginning the decaying process.

24. The safety belt assembly according to claim 17 wherein said first and second members being plates.

* * * * *